United States Patent [19]

Hautemont

[11] Patent Number: 4,734,026
[45] Date of Patent: Mar. 29, 1988

[54] DEVICE FOR THE PREFORMING AND TRANSFER OF A BANDEROLE IN A CONTAINER THERMOFORMING INSTALLATION

[75] Inventor: Jean-Claude Hautemont, Gif sur Yvette, France

[73] Assignee: Erca Holding, Les Ulis, France

[21] Appl. No.: 59,594

[22] Filed: Jun. 8, 1987

[30] Foreign Application Priority Data

Jun. 9, 1986 [FR] France .................................. 86 08295

[51] Int. Cl.⁴ ........................ B29C 51/16; B29C 51/18
[52] U.S. Cl. .................................. 425/302.1; 425/306; 425/383
[58] Field of Search ............... 425/116, 117, 121, 122, 425/289, 294, 302.1, 387.1, 390, 391, 402, 306, 383

[56] References Cited

U.S. PATENT DOCUMENTS

| | | | |
|---|---|---|---|
| 3,709,643 | 1/1973 | Nasica | 425/324.1 |
| 3,827,128 | 8/1974 | Nasica | 264/269 |
| 3,957,412 | 5/1976 | Lechevallier | 425/324.1 |
| 4,134,717 | 1/1979 | Phillippon | 425/305.1 |
| 4,335,635 | 6/1982 | Hautemont | 425/122 |
| 4,370,118 | 1/1983 | Dronet | 425/305.1 |
| 4,394,115 | 7/1983 | Dronet | 425/122 |
| 4,452,580 | 6/1984 | Dronet | 425/122 |
| 4,512,734 | 4/1985 | Dronet et al. | 425/302.1 |
| 4,591,327 | 5/1986 | Hautemont | 425/306 |

FOREIGN PATENT DOCUMENTS

| | | |
|---|---|---|
| 2034915 | 12/1970 | France . |
| 2256013 | 12/1974 | France . |
| 2339474 | 1/1976 | France . |
| 2350190 | 5/1976 | France . |
| 2340185 | 2/1977 | France . |
| 2342145 | 9/1977 | France . |
| 2528355 | 6/1982 | France . |
| 2528349 | 12/1983 | France . |

Primary Examiner—Willard Hoag
Attorney, Agent, or Firm—Dennison, Meserole, Pollack & Scheiner

[57] ABSTRACT

The device for pre-forming and transfer of a banderole in a container thermoforming installation comprising a molding unit equipped with forming chambers and movable between a high thermoforming position and a low container-stripping position, is characterized in that the introduction unit for introducing the banderole into the forming and cutting chambers is fast, via a support plate, with a banderole pre-winding unit, of which the chambers are aligned axially under the forming chambers. The supporting table of the pre-winding unit is movable synchronously with the supporting table of the unit for longitudinally cutting the master-band into individual bands from which said banderoles are cut. A tension roller is applied against the unrolled portion of the master-band in order to compensate the length variations thereof due to the vertical displacements of the pre-winding units.

21 Claims, 17 Drawing Figures

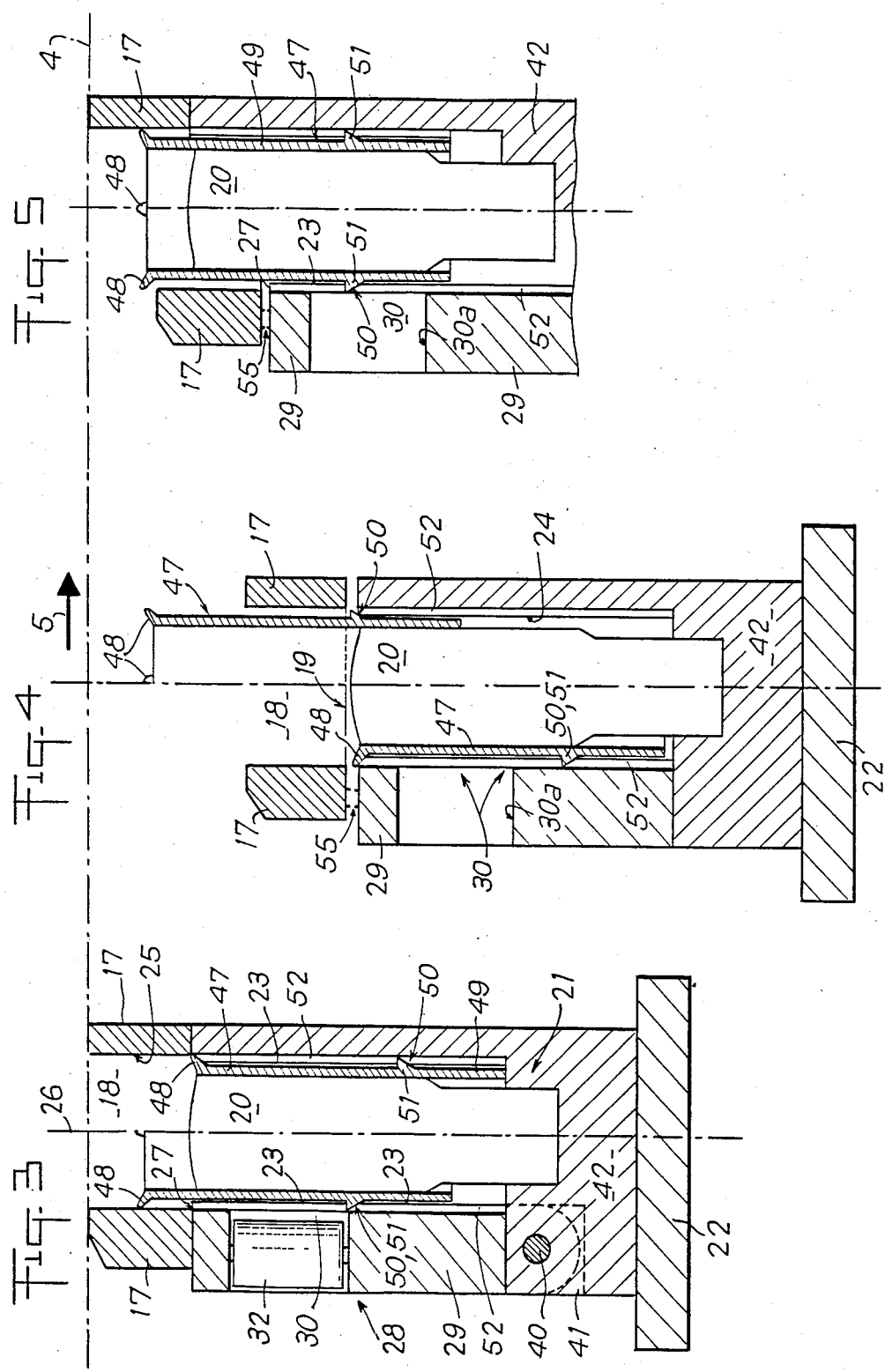

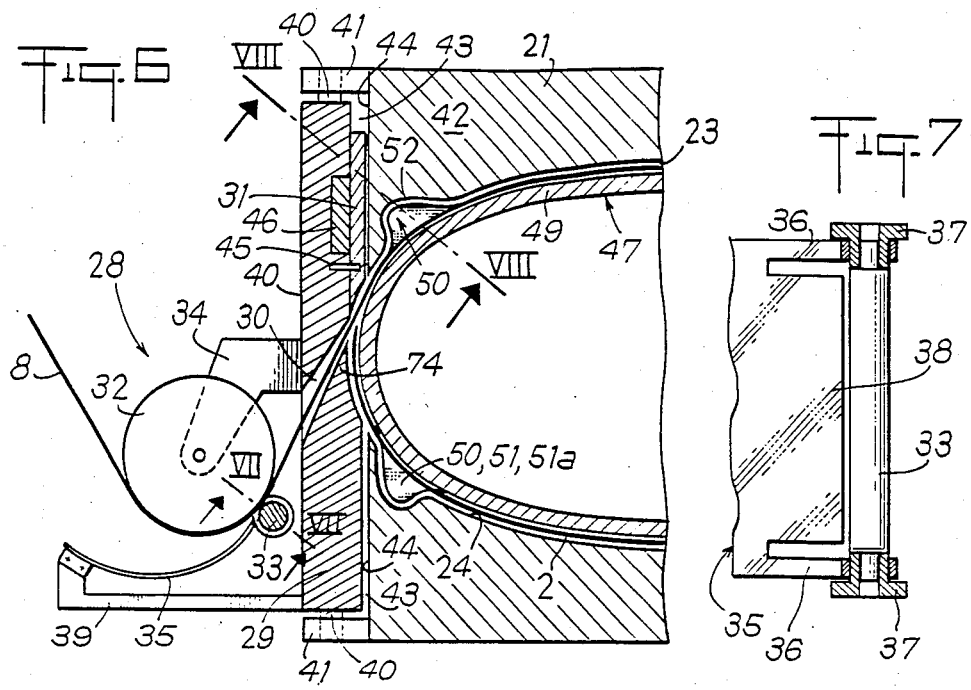
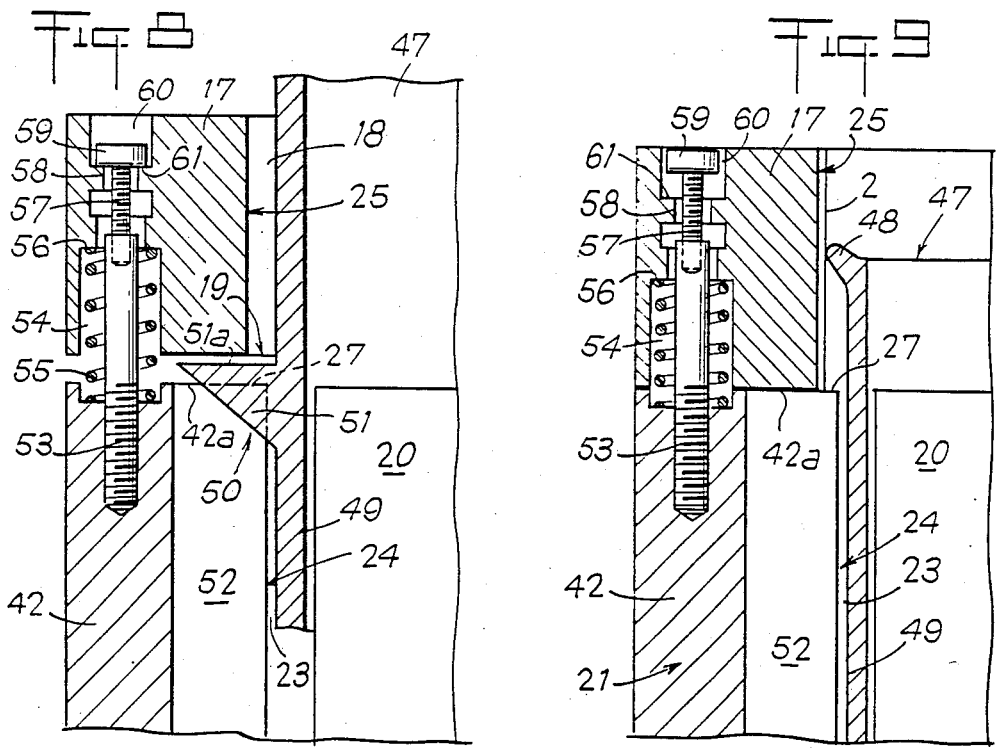

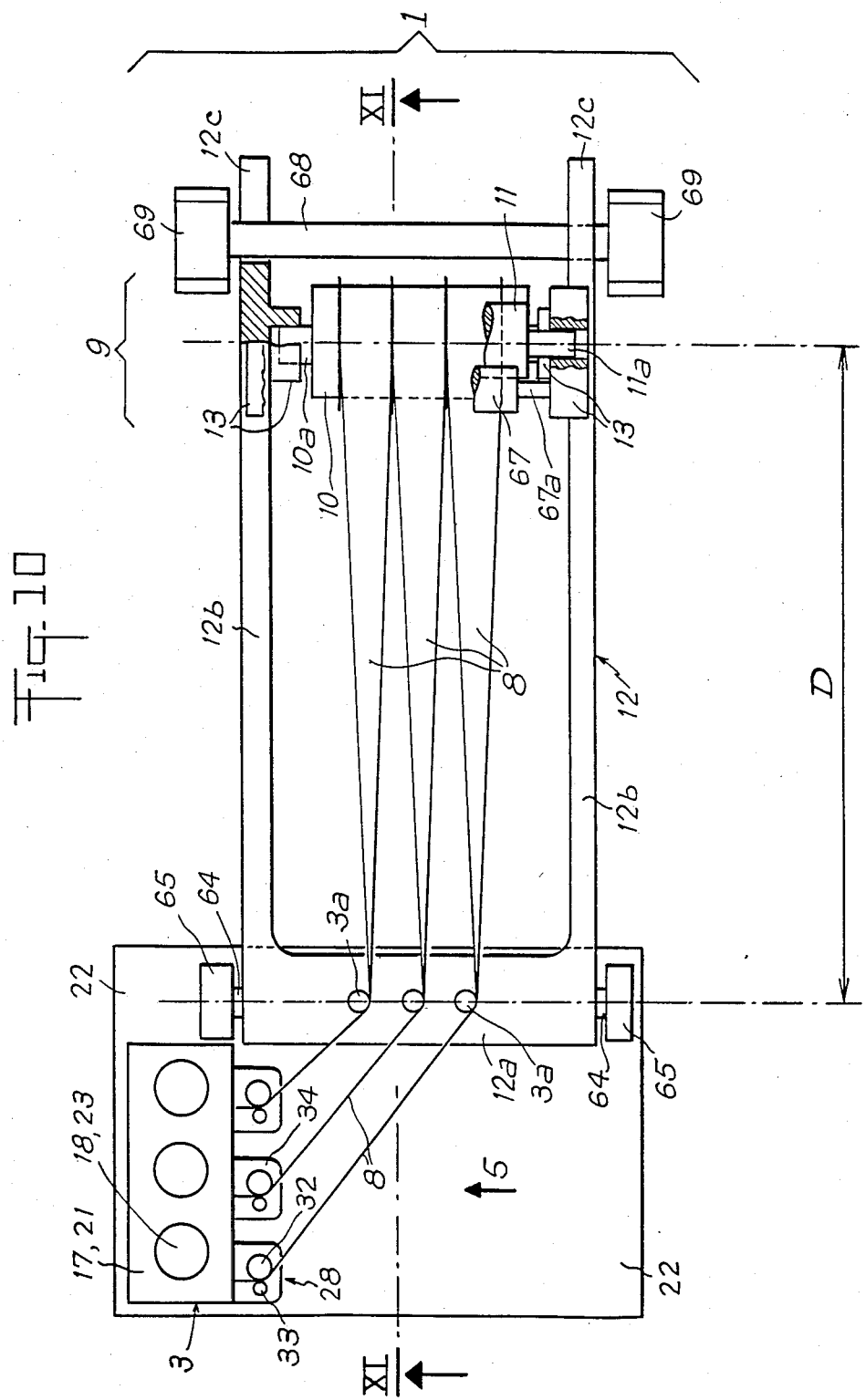

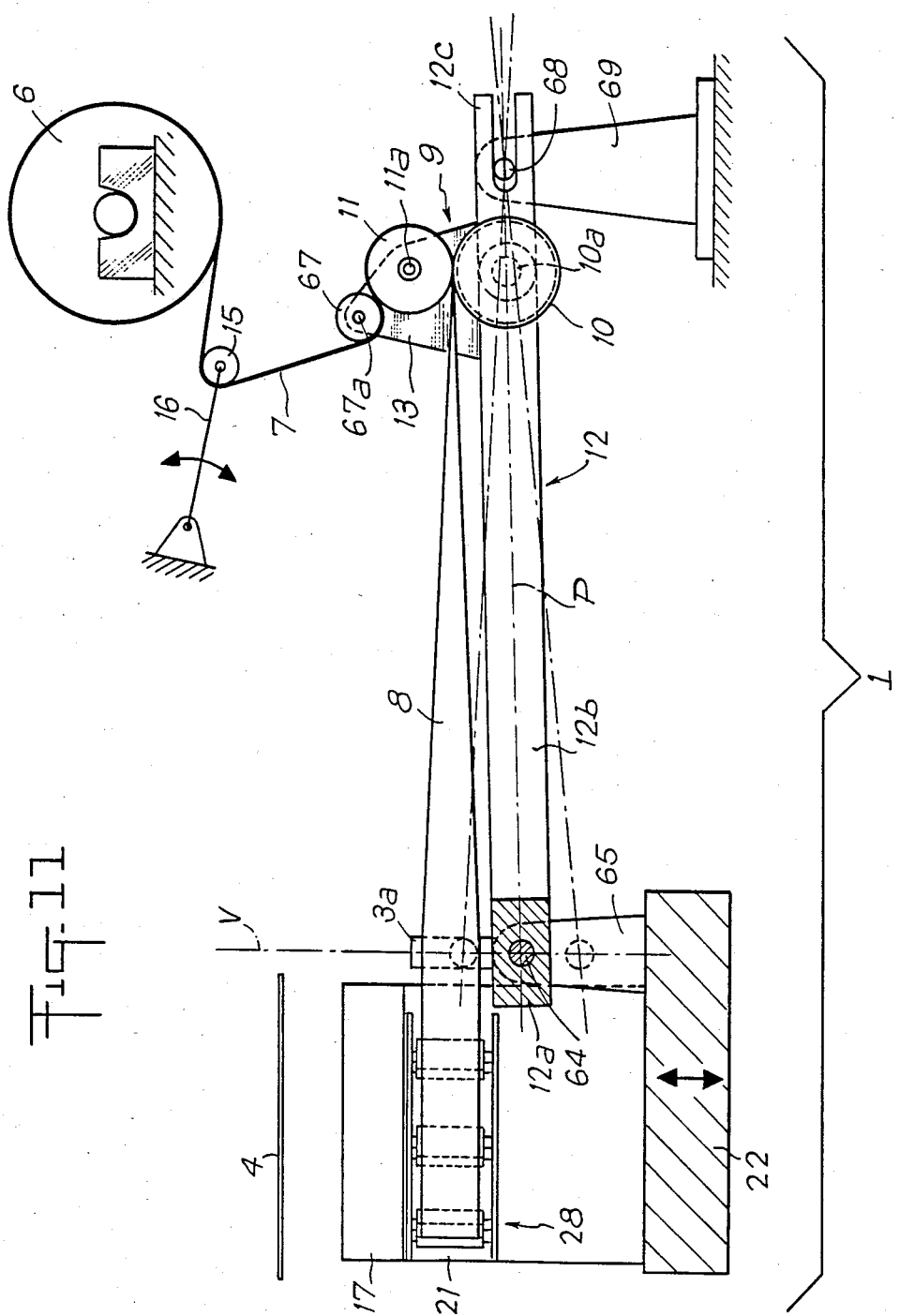

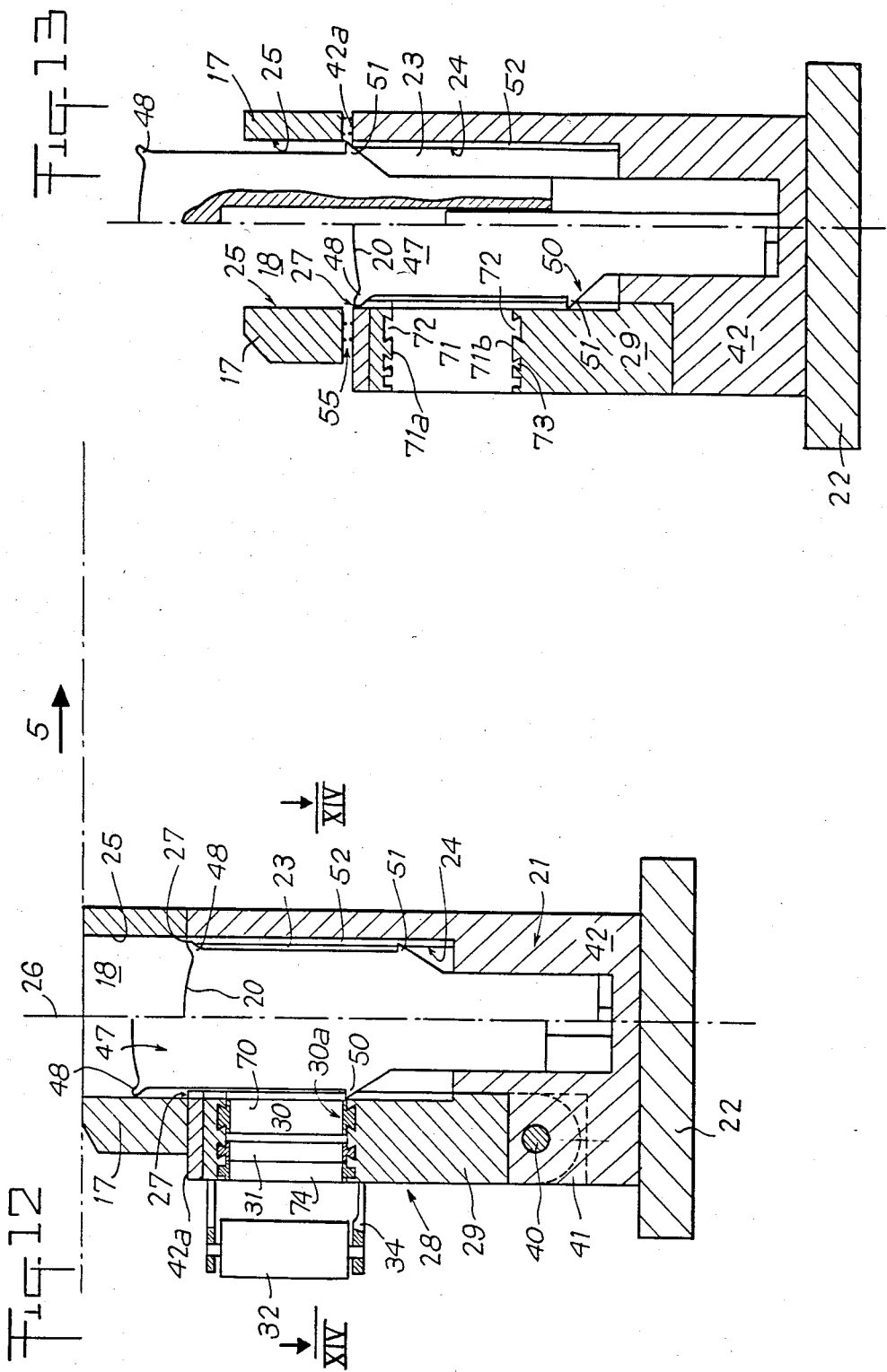

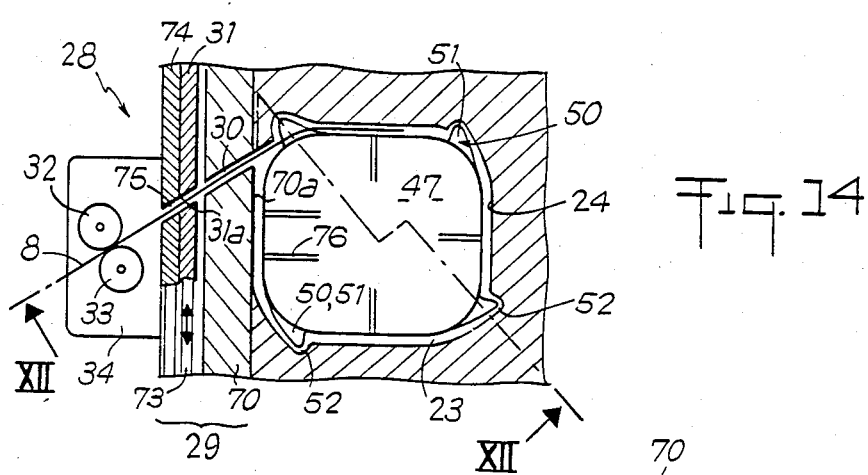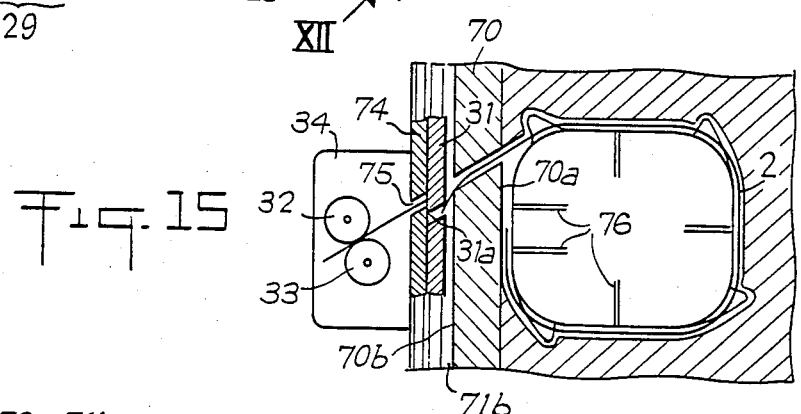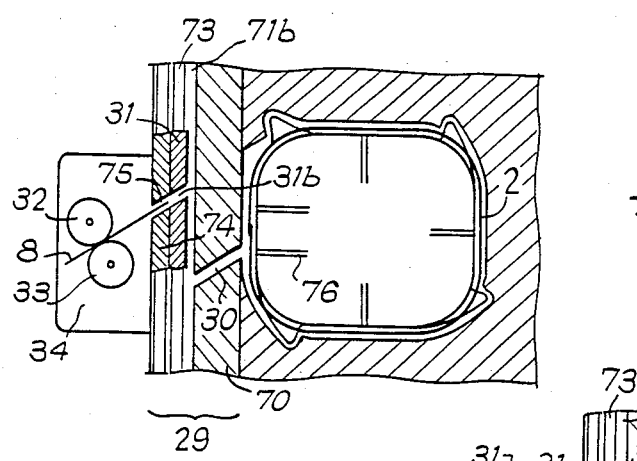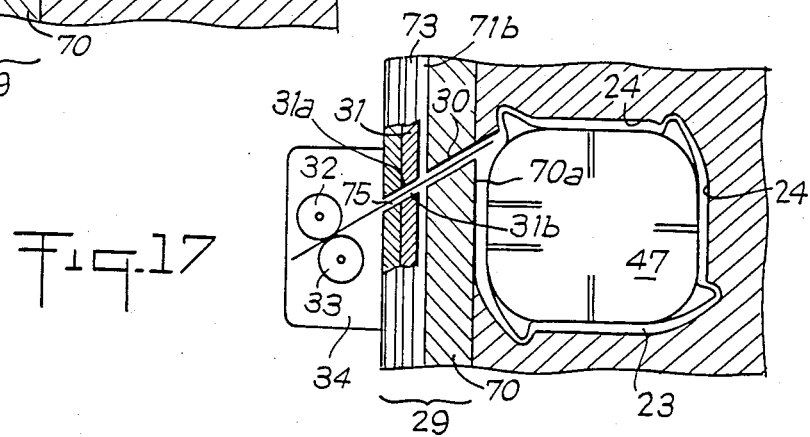

4,734,026

DEVICE FOR THE PREFORMING AND TRANSFER OF A BANDEROLE IN A CONTAINER THERMOFORMING INSTALLATION

FIELD OF THE INVENTION

The present invention relates to a device for preforming a banderole in a container thermoforming installation which comprises a molding unit equipped with a plurality of vertical cylindrical forming chambers, open at their top part and having at their lower part an opening adapted to be closed by a bottom element movable with respect to the molding unit, in such a way as to be capped over by the corresponding molding chamber which is movable with said molding unit between a high position, called thermoforming position and a low position called container stripping position, device of the type comprising:

a master-band supporting roller mounted in fixed bearings, a cutting unit for cutting the master-band longitudinally into individual bands, which unit is mounted on a first supporting table remote laterally from the molding unit, at least one guiding roller of adjustable position for every individual band, a pre-winding unit for pre-winding the banderoles, which unit is placed under the molding unit which rests on it, and is mounted on a second supporting table which is vertically movable between a position corresponding to the thermoforming position and a position corresponding to the stripping position of the molding unit, said pre-winding unit comprising a plurality of vertical cylindrical pre-winding chambers, each one in alignment with one of the forming chambers, so that the vertical wall of the pre-winding chamber defines an outline which is homothetic to that of the forming chamber, yet slightly smaller than the outline of the latter, so as to constitute with its upper edge, an annular holding shoulder member which also defines the bottom opening of the forming chamber, a banderole introduction and cutting unit for every pre-winding chamber, of which part of the vertical side wall is constituted by the inner face of a support-plate of the introduction and cutting unit which further comprises a vertical access slot provided in said support-plate and issuing obliquely into the pre-winding chamber, a cutter adapted to cooperate with a counter-blade for cutting the back end of the banderole introduced at least partly into the pre-winding chamber, and one pair of introduction rollers placed upstream of the cutter and of the slot and adapted to grip the individual band and to drive same at a pace equal to the length of one banderole, a shaping member comprising a rod which traverses the pre-winding chamber and forms with the vertical wall thereof a narrow annular pre-winding and guiding chamber, and of which the upper part, on the one hand, constitutes at least part of the bottom plate and has a cross-section of similar but smaller shape than that of the vertical wall of the forming chamber, so that the distance between the vertical wall of the forming chamber and the peripheral face of the upper end of the shaping member is at least equal to the thickness of a banderole, and on the other hand, is adapted to penetrate into the forming chamber and to apply said banderole and keep it applied against the vertical side wall of said forming chamber, and transfer means provided in the pre-winding and guiding chamber, and adapted to support said banderole until this has been transferred to the forming chamber by a relative movement between said transfer means and said forming chamber.

BACKGROUND OF THE INVENTION

Container thermoforming installations equipped with decorated or undecorated banderole preforming and transfer means are generally known from German Utility Model No. 1 969 306, and from French Pat. Nos. 2 034 915 and 2 256 013. In the case of the German Utility Model and of French Pat. No. 2 034 915, the banderole is introduced into the forming chamber through the front opening thereof, so that the forming chambers should be moved sideways or be tilted about a horizontal axis in order to become accessible to the corresponding banderoles prepared in a pre-forming and transfer device.

In the case of French Pat. No. 2 256 013, the banderoles are introduced through the open base of the forming chambers beneath which is placed the banderoles pre-winding and transfer unit which has no shaping member.

Banderoles preforming and transfer devices equipped with one shaping member for every forming chamber in the molding unit superposed to the banderoles pre-winding unit are known for example from French Pat. Nos. 2 339 474, 2 340 185, 2 342 145, 2 528 349 and 2 528 355. One of the disadvantages found with these known pre-forming devices is that the upstream end of the individual band from which the banderole is cut is at a certain distance from the pre-winding chamber and has to be introduced therein (French Pat. Nos. 2 340 185, 2 528 349 and 2 528 355) or that the end of the individual band must be withdrawn from the access slot into the pre-winding chamber after the cutting of a banderole (French Pat. Nos. 2 339 474, 2 342 145 and 2 528 355), this screating a non-productive time and entailing risks of the banderole or of the free end of the individual band being jammed during the pre-winding cycle of the next banderole.

Shaping members adapted to penetrate into the forming chamber through the base thereof and which are operationally coupled to a transfer member provided in the pre-winding chamber have already been proposed for example in French Pat. Nos. 2 350 190, 2 528 349 and 2 528 355.

In the case of Pat No. 2 350 190, the time available for winding the banderole and cutting it in the pre-winding chamber is maximum compared with the time allowed between two successive banderole transfer runs from the pre-winding chamber to the shaping chamber, but this embodiment requires a complicated mechanical structure which is relatively delicate and as such does not permit high moving speeds of the molding unit between its forming position and its transfer position. Similar problems occur in the case of Pat. Nos. 2 528 349 and 2 528 355.

It is found that in the known devices, and because of the relative positions between the forming chamber, the banderole introduction and cutting unit and the transfer member, the time allocated for the preparation of a wound banderole is insufficient. This shortage of time is even more of a problem in the case of the preparation of very long banderoles which, in the pre-winding chamber, should already have a shape very similar to that of the forming chamber.

SUMMARY OF THE INVENTION

It is the object of the present invention to reduce, if not completely eliminate, the aforesaid disadvantages in a pre-forming device of the type described hereinabove.

This object is reached according to the invention, in that:

the shaping member and the transfer member are joined together, and the distance between the upper end of the shaping member and the transfer member is, on the one hand, at least equal to the axial distance between the bottom of the access slot and the central part of the forming chamber and, on the other hand, less than the distance between the upper end of the forming chamber in the thermoforming position and the lower end of said forming chamber in the stripping position;

the assembly of the elements constituting the banderole introduction and cutting unit is joined to the pre-winding unit by means of the support-plate and is permanently associated to the access slot of the pre-winding chamber;

the first supporting table of the unit for longitudinally cutting the master-band into individual bands is mounted for moving synchronous with the vertical displacements of the second supporting table of the pre-winding unit and the molding unit, and a tension roller is provided on the path of the master-band between its supporting roller and the longitudinal cutting unit, said tension roller being applied against the master-band so as to compensate the length variations of the unrolled portion of the master-band which are due to the displacement of the longitudinal cutting unit, during the vertical displacement of the banderole pre-winding unit.

With this particular design, winding and cutting of another banderole can already be performed during a container thermoforming operation during which the upper end of the shaping member is still in the central part of the forming chamber and progressively goes down towards the opening at the bottom of the latter. In addition, the free end portion of the individual band from which the next banderole is cut is permanently engaged, either in the slot of the cutter counter-blade, or in the access slot which acts as a counter-blade, so that the free end of the individual band is still guided downstream of the pair of introduction rollers and said individual band can be introduced into the pre-winding chamber without difficulty and with a high moving speed.

DETAILED DESCRIPTION OF THE DRAWINGS

The invention will be more readily understood on reading the following description, with reference to the accompanying drawings, in which:

FIGS. 3 to 5 are elevational views of a vertical cross-section through a forming chamber of the molding unit, of the pre-winding unit and of the banderole introduction and cutting unit of the pre-forming and transfer device, these views showing different working positions of the pre-winding unit, of the molding unit and of the shaping member;

FIG. 6 is a partial plan view of a horizontal section through the pre-winding unit and the introduction and cutting unit of the banderole pre-forming and transfer device at the upper end of the access slot, the molding unit being removed for clarity's sake;

FIG. 7 is a side elevation showing one detail of the introduction and cutting unit according to FIG. 6 in a first embodiment of the invention;

FIGS. 8 and 9 are partial elevations of a vertical section (along line VIII—VIII of FIG. 6) through the side walls of the molding unit, of the pre-winding unit and of the shaping member, and showing the molding unit, respectively, slightly apart (a few millimeters) from the pre-winding unit (FIG. 8) and resting on said unit (FIG. 9);

FIG. 10 is a plan view of a container thermoforming station in an installation for the packing of a pasty or liquid product, to which thermoforming station is incorporated a second embodiment of the banderole pre-forming and transfer device according to the invention;

FIG. 11 is a side elevation of the thermoforming station and of a vertical section along the line XI—XI of the banderole pre-forming and transfer device according to FIG. 10;

FIGS. 12 and 13 are elevational views of a cross-section through the forming chamber of the molding unit, of the pre-winding unit and of the introduction and cutting unit in a second embodiment of the pre-forming and transfer device, cross-section along line XII—XII of FIG. 14, these views showing the molding unit in forming position and in stripping position respectively, and showing the shaping member in various working positions; and FIGS. 14 to 17 are plan views of a horizontal cross-section along the line XIV—XIV of FIG. 12, at the level of the introduction and cutting unit and of the pre-winding unit of the second embodiment of the pre-forming and transfer device.

DETAILED DESCRIPTION OF THE INVENTION

Figure 1:
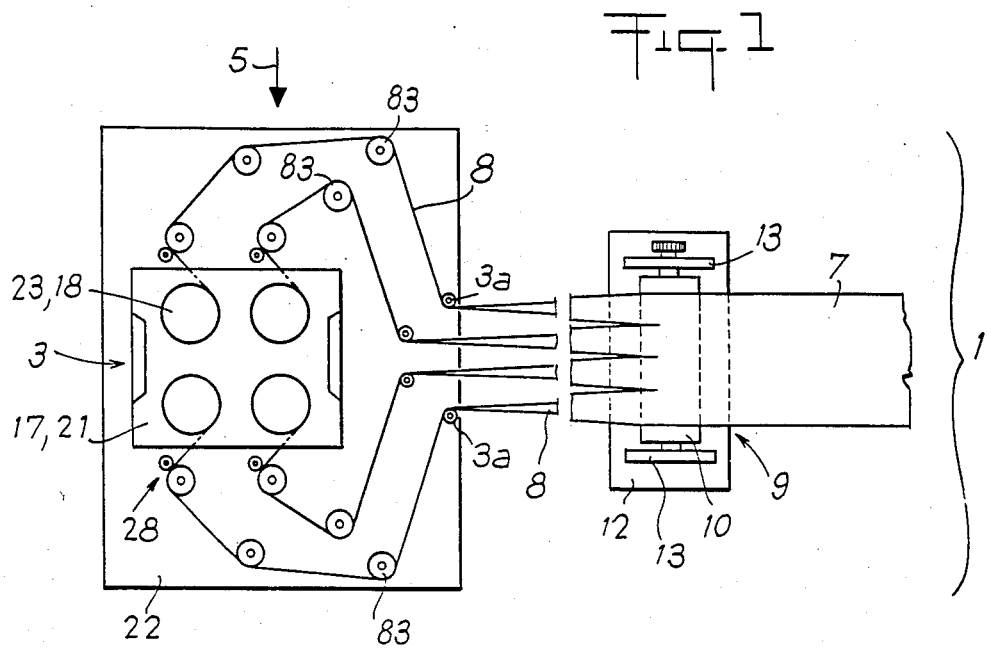
FIG. 1 is a plan view of a container thermoforming station in a product-packing installation, to which thermoforming station is incorporated a first embodiment of the banderole pre-forming and transfer device according to the invention.
Figure 2:
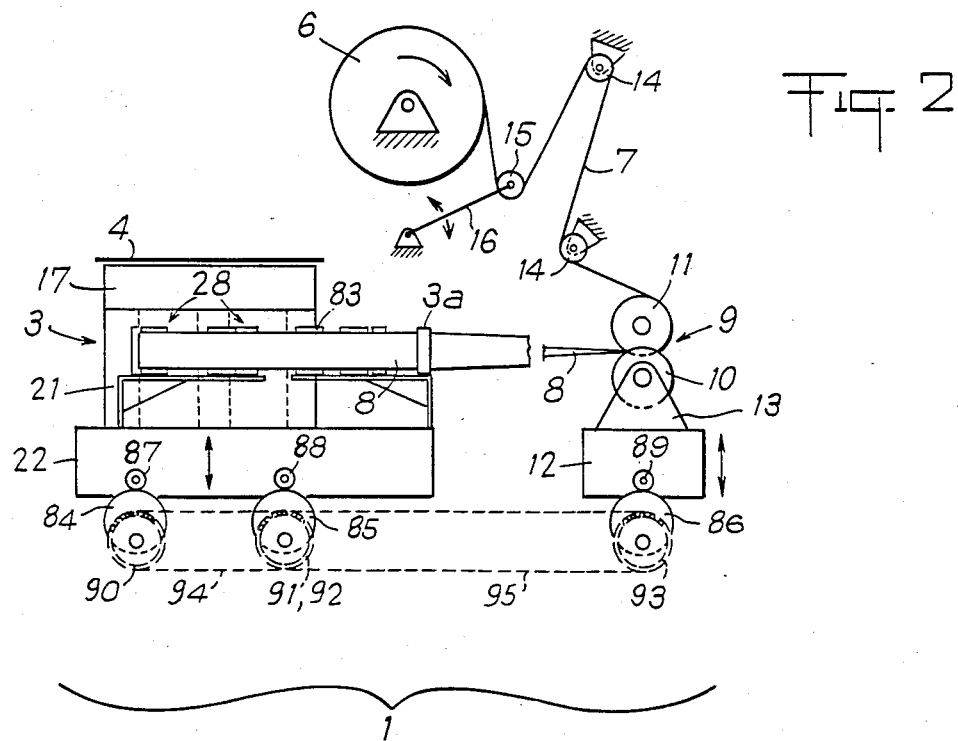
FIG. 2 is a side elevation of the thermoforming station equipped with the banderole pre-forming and transfer device according to FIG. 1.

Referring first to FIGS. 1 and 2, these show the general structure of a first embodiment of the device 1 for the pre-forming and transfer of a decorated or undecorated banderole 2, according to the invention. Said device 1 is associated with a thermoforming station 3 which is part of a packing installation (not shown), for example of the type which thermoforms containers from a thermoplastic band 4, which fills them with a product and which seals the filled containers with a lid band before cutting them from the thermoplastic band and said lid band sealed to the latter. This type of installation is widely known from the prior art and therefore will not need to be described in detail.

One part of the pre-forming and transfer device 1 is situated under the moving path of the thermoplastic band 4 which band moves stepwise in the direction of arrow 5. Said device 1 comprises laterally remote from a first vertical return roller 3a of the thermoforming station 3, a supporting roller 6 for a master-band 7 from which are longitudinally cut individual bands 8 of a width corresponding to the height (or width) of the banderoles 2 which will be cut crosswise from each of the individual bands 8. The longitudinal cutting of master-band 7 into individual bands 8 is performed with a longitudinal cutting unit 9 of known structure (see for example French Pat. Nos. 2 034 915 and 2 403 177) and comprising a lower roller equipped with annular blades 10 and an upper pressing roller equipped with counter-blades 11 between which the master-band passes while being cut longitudinally into individual bands 8. Said blade rollers 10, 11 of the longitudinal cutting unit 9 also ensure the stepwise forward movement of the master-band 7 and of the individual bands; they are driven, in appropriate manner, synchronously with the introduction of the banderoles 2 and with the forward movement of individual bands 8 and are mounted on a first supporting table or similar member 12 via lateral bearings 13 fast with said table 12. In general, such supporting table or similar member 12 is movable.

According to a first embodiment, said first supporting table 12 is vertically movable. Between the blade rollers 10, 11 of the longitudinal cutting unit 9 and the roller 6 supporting the master-band 7 there is provided, for example, at least one fixedly mounted return roller 14 and one tension roller 15 supported on one end of a biased lever 16 articulated at its other end about a fixed spindle and cooperating with a spring, not shown, so as to permanently urge said tension roller 15 against the master-band 7 and to keep the tension of the latter constant, despite the length variations of the portion of master-band between supporting roller 6 and longitudinal cutting unit 9, which variations are caused by the cyclic displacements, vertically for example, of the first supporting table 12 and the longitudinal cutting unit 9.

At the forming station 3, the pre-forming and transfer device 1 comprises, under the path of the thermoplastic band 4, a molding unit 17 equipped with a plurality of vertical cylindrical forming chambers 18, which are open at the top and provided at their lower end with a passage opening 19 which may be at least partly closed by a base element 20. Said base element 20 is vertically movable either with respect to the molding unit 17 or together with the latter. The molding unit 17 may be stationary, but can also be vertically movable with respect to the base element 20.

Molding unit 17 which, particularly when the containers to be thermoformed are very wide, very long and rather shallow, can be of relatively small height, is mounted for moving vertically between a high position corresponding to the thermoforming position of the forming chambers 18 (see FIGS. 3 and 12) and a low position corresponding to the stripping position of the forming chambers (see FIGS. 4 and 13) in which the container, which has just been thermoformed, can move one step horizontally without being hindered by the molding unit 17.

The pre-forming and transfer unit further comprises a pre-winding unit 21 for the decorative banderoles 2. Said pre-winding unit 21 is placed under the molding unit 17 which rests on the upper face of unit 21. Said pre-winding unit 21 and consequently also molding unit 17 are mounted in superposed manner on a second supporting table 22 which is vertically movable between a high position corresponding to the container's thermoforming position (FIGS. 3 and 12) and a low position (FIGS. 4 and 13) which corresponds to the stripping position of the molding unit 17 and of its forming chambers 18. Said pre-winding unit 21 comprises a plurality of vertical cylindrical pre-winding chambers 23 situated under forming chambers 18 with which they communicate through their upper opening; each one of said chambers 23 is aligned with one of the forming chambers 18 so that its vertical wall 24 defines an outline which is homothetic to that of vertical wall 25 of forming chamber 18 but slightly less than the outline thereof, so as to constitute, by its upper edge, an annular holding shoulder 27 which, at the same time, defines the bottom opening of the forming chamber.

Moreover, the pre-forming and transfer device 1 is equipped, for each pre-winding chamber 23, with a unit 28 for introduction and transverse cutting of a banderole 2, said unit comprising a support-plate 29 adjoining the pre-winding chamber 23 so that the inner face of said support-plate 29 constitutes a more or less important part of the vertical side wall 24 of said pre-winding chamber 23. Said banderole introduction and transverse cutting unit 28 comprises, on the one hand, a vertical access slot 30 provided, according to a first embodiment, directly in the support-plate 29 and issuing obliquely from the outside into the pre-winding chamber 23 and operationally-coupled on the inner face of support-plate 29, with a cutter 31 adapted to cooperate with one of the inner edges of access slot 30 in order to cut the rear end of the banderole 2 which has been completely introduced into the pre-winding chamber 23 beforehand, and on the other hand, a pair of introduction rollers 32, 33 situated in front of the widening-out inlet of access slot 30 and mounted in bearings fast with support-plate 29. The end part of an individual band 8 is pinched between the rollers 32, 33 of a pair of introduction rollers which are cyclically imparted with a rotation movement so that the laying-out length of the periphery of one of introduction rollers 32, 33 is slightly more than the length of a one-step motion of individual band 8 moved under the action of one of the blade rollers 10, 11 of a step equal to the length of a banderole 2. As soon as the length of a banderole 2 is delivered by introduction rollers 32, 33, the forward movement of the individual bands is interrupted by blade rollers 10, 11 and introduction rollers 32, 33 start to slip on the corresponding individual band. This particular disposition and the appropriate adjustment of the pressure of the introduction rollers on the individual band, ensure that the latter is constantly taut without being stretched out.

As can be seen in FIGS. 6 and 7, the pair of introduction rollers comprises a drive roller 32 of large diameter having a peripheral face with a high coefficient of friction, as well as a smooth pressing roller 33 with a low coefficient of friction, which presses the individual band 8 permanently against drive roller 32 which is connected to a motor, such as that driving stepwise blade rollers 10, 11 and consequently master-band 7 and individual bands 8. As indicated hereinabove, the laying-out length of the periphery of drive roller 32 during a forward motion cycle, is greater than the length of one step covered by individual bands 8, but the pressure exerted by rollers 32, 33 on individual band 8 is adjusted in such a way that they slip on said band as soon as its forward movement has been interrupted by the stopping of blade rollers 10, 11. Drive roller 32 is mounted on support-plate 29 of the introduction and cutting unit 28, for example via two rigid support arms 34 whereas pressing roller 33 is mounted on said support-plate 29 via a curved leaf spring 35 which is disposed edgewise so as to partly surround drive roller 32 and to form with part of the periphery of the latter, a kind of guiding funnel for the end of the individual band 8, said funnel narrowing towards its front end (as taken in the forward moving direction of individual band 8) where said curved leaf spring 35 carries the ends of pressing roller 33 and urges the latter against drive roller 32. The front part of curved leaf spring 35 is cut so as to have a laying-down U-shaped indentation, the transversal branch of the U being parallel to the axis of pressing roller 33 and the side branches extending rearwardly and in parallel to the moving direction of the individual band. Because of said laying-down U-shaped indentation, the front end part of the spring 35 comprises, on the one hand, two horizontal supporting tabs 36 which, by their free end, clamp around the lower and upper supporting rings 37 of the pressing roller 33 and, on the other hand, between the two tabs 36 and the pressing roller 33, a guiding strip 38 of which the free end reaches very close to the contact zone between the two introduction rollers 32, 33. The back end of the curved vertical leaf spring 35 is secured on an extending arm 39 projecting from support-plate 29 with which it is fast. Said leaf spring 35 acts as a guiding wall when a new individual band 8 is inserted between introduction rollers 32, 33 and moved towards access slot 30. It should be noted that, owing to the use of a roller of large diameter 32 and a roller of small diameter 33, the contact zone between the rollers of the pair of rollers 32, 33 can be situated very close to access slot 30. At its lower end situated under pre-winding chamber 23, support-plate 29 is pivotally mounted on a horizontal spindle 40 which is itself mounted in bearings 41 of the body 42 of the pre-winding unit 21.

Thus, introduction and cutting unit 28 can be pivoted anti-clockwise (as illustrated in FIGS. 3 to 6 and 12 and 13) to give access to the pre-winding chamber 23 by its part normally covered over by support-plate 29. The cutter 31 which cooperates with an inner edge of access slot 30 for cutting a banderole 2 is constituted by a vertically extending thin blade, housed in a narrow space 43 between the inner face of support-plate 29 and an external vertical face 44 of body 42 of the pre-winding unit 21, in such a way as to be able to penetrate inside pre-winding chamber 23 and to pass in front of the inner edges of access slot 30. For an accurate cutting of the banderole 2, blade 31 is pivotally mounted, close to its upper end, on support-plate 29 by means of a horizontal pivot 45, perpendicular to blade 31 and to the flat vertical inner face of support-plate 29 inside which is embedded, by three of its faces, a permanent magnet bar 46 which keeps the cutter 31 against the inner edges of access slot 30.

The banderole pre-forming and transfer device 1 further comprises a shaping member 47 of tubular (FIGS. 3 to 6 and 8 and 9) or cylindrical (FIGS. 12 to 17) shape, which comprises at its upper end, a certain number of applicator fingers 48 extending radially outwardly so as to leave between their top part and the vertical wall 25 of the forming chamber 18 a gap of which the width is between one and five times the thickness of a banderole 2.

According to a first embodiment illustrated in FIGS. 3 to 6, and 8 and 9, the shaping member 47 is essentially constituted by a hollow or tubular rod 49 which carries at its upper end the applicator fingers 48 and is mounted for moving vertically inside forming chamber 18 and pre-winding chamber 23, and which fits over, without any noticeable play, the base element 20 which could however, if necessary, be produced in one piece with shaping member 47 (see FIGS. 12 to 17). The external side face of base element 20 or of shaping member 47 made in one piece with said element 20, has a shape which is homothetic to that of the vertical wall 25 of forming chamber 18 and to that of the vertical wall 24 of pre-winding chamber 23 and defines with said vertical wall 24 an annular guiding and pre-winding chamber of which the radial width is between two and five times the thickness of a banderole 2. Because of that small radial width, banderole 2 is accurately guided into chamber 23 and takes on a wound shape which is already very near the shape and radial dimension of the forming chamber 18 in which it will radially release and remain applied against the vertical wall 25 thereof. The upper end of shaping member 47 constitutes, according to a first embodiment illustrated in FIGS. 3 to 6, and 8 and 9, part of the bottom of the forming chamber 18, and according to the second embodiment (FIGS. 12 and 13) the entire bottom part of said forming chamber 18 when this is lowered to the level of the annular holding shoulder 27 in the thermoforming position. Applicator fingers 48 can, in fact, be retracted in housings of the annular holding shoulder 27 of vertical wall 24 defining the guiding and pre-winding chamber 23.

The banderole pre-forming and transfer device 1 further comprises a transfer member 50 which is provided in annular guiding and pre-winding chamber 23 and supports the lower longitudinal edge of the banderole 2 until said banderole has been transferred to the forming chamber 18 by a relative movement between transfer member 50 and said forming chamber 18. In the illustrated example, transfer member 50 comprises a plurality of radial drivers 51, provided inside the annular chamber 23, plumb with applicator fingers 48, and extending radially from the external vertical face of shaping member 47 with which they are fast, beyond the top of the corresponding applicator fingers 48, so that their free point is situated radially outside the periphery defined by the side wall 25 of the forming chamber 18.

The transfer member 50, i.e. the drivers 51, is fast with the tubular rod 49 or with the cylindrical solid body of shaping member 47. The vertical distance between the upper end, or to be more precise, one applicator finger 48 of the shaping member 47 and the corresponding driver 51 is, on the one hand, at least equal to the vertical axial distance between the bottom 30a of access slot 30 and the central part of forming chamber 18, and on the other hand, less than the distance between the upper end of the forming chamber 18 in its thermoforming position (FIGS. 3 and 12) and the lower end of said forming chamber 18 in its stripping position (FIGS. 4 and 13).

In order to allow the drivers 51 to extend by their free point to beyond the vertical projection of the periphery of the wall 25 of forming chamber 18, the vertical wall 24 of the guiding and pre-winding chamber 23 is provided with vertical grooves of asymmetrical cross-section 52 which are open towards said guiding chamber 23 and issue on the horizontal upper face 42a of the body of the pre-winding unit 21 against which rests the molding unit 17. The asymmetrical shape of the cross-section of every groove 52 allows for the moving direction of the front end of individual band 8 inside the guiding chamber 23. For this reason, the groove side situated downstream of the central part of groove 52 has a relatively small inclination with respect to the wall 24 of chamber 23, whereas the groove side situated upstream of said groove 52 is sharply inclined, of the order for example of 70° to 85° with respect to the wall 24 (see FIGS. 6 and 14 to 17). Owing to this design, the front end of individual band 8 cannot become blocked inside a guiding groove 52 during its introduction into chamber 23.

To ensure a good transfer of the banderole 2 from the guiding and pre-winding chamber 23 to the forming chamber 18 where it will be held by annular should 27, the molding unit 17 is resiliently spaced from the upper face 42a of the body 42 of the pre-winding unit 21 at a distance of about a few millimeters, such as for example 3 mm, and the end-of-rising stroke of the drivers 51 projects over a few millimeters, for example 2 mm, from the upper face 42a of pre-winding unit 21. Thus, the driver's 51 upper face 51a against which rests the lower longitudinal edge of the banderole 2 during its transfer from chamber 23 to forming chamber 18, can place itself above annular shoulder 27 (FIG. 8) and as soon as banderole 2 is entirely inside forming chamber 18, said banderole spreads or releases radially in the direction of vertical wall 25 and is held by annular shoulder 27, when the drivers 51 descend to their low position (FIG. 9).

It should be noted that the resilient spacing of the molding unit 17 from the body 42 of the pre-winding unit 21 is limited to a few millimeters, so that it cannot in any way hinder the thermoplastic band 4 when unit 17 occupies the high thermoforming position in which said spacing is actually eliminated as soon as the clamps of the forming station are applied against the upper face of the thermoplastic band 4 and at the same time push unit 17 against the body 42 of unit 21 (FIG. 9).

To obtain the vertical resilient spacing between molding unit 17 and body 42 of the pre-winding unit 21, a plurality of vertical threaded rods, called anchoring rods 53, are evenly distributed around guiding chamber 23 and are screwed into the upper part of body 42 of unit 21. The upper part of said anchoring rods 53 penetrates into a corresponding shoulder bore 54 provided in molding unit 17 from the lower face thereof and receiving a helical spring 55 which applies against, first the annular shoulder 56 of bore 54, and second, the upper face 42a of body 42 of unit 21. The upper end of anchoring rod 53 is tapped and receives the lower end of an adjusting screw 57, going through a hole 58 coaxial to the bore 54, and of which the head 59 is housed in a recess 60 provided in molding unit 17 from the upper face thereof, and of which the annular base 61 acts as a stop for screw head 59, the position of which with respect to the upper face 42a of body 42 determines the maximum spacing between molding unit 17 and body 42 of pre-winding unit 21.

As can be seen in FIGS. 1, 2, 10 and 11, it is possible to combine all the pre-winding units 21, each one of which corresponds to one forming chamber 18 of the molding unit 17, with only one unit 9 for longitudinally cutting the master band 7 into individual bands 8. In view of the fact that individual bands 8 are cut longitudinally when the master-band 7 is in the horizontal position and access slots 30 in the pre-winding units are in the vertical position, said individual bands 8 must be twisted 90° with a vertical guiding roller 3a, the distance D of which to the longitudinal cutting unit 9 being at least equal to eight times the width of individual band 8. Said guiding roller 3a and optionally, other return rollers 83 provided on the path of the individual band 8 towards the pre-winding unit 21 are fixed directly or indirectly onto the second supporting table 22 on which rest molding unit 17, pre-winding units 21 and introduction and cutting units 28. It is to be noted that at least one of the return rollers 83 is adjustable in position perpendicularly to its vertical axis.

The simultaneous vertical rising and lowering of supporting tables 12 and 22 of the preforming and transfer device 1 according to FIGS. 1 and 2 prevent any extension of the path of an individual band 8 between the longitudinal cutting unit 9 and its corresponding pre-winding unit 21. Said simultaneous vertical rising or lowering movement is ensured by vertical guiding of the two tables 12 and 22 and by a plurality of eccentrics of similar size and angular position, which actuate the rollers 87, 88, 89 provided on the two tables 12 and 22 and are driven synchronously by means of toothed wheel 90, 91, 92, 93 and chains 94, 95 mechanism so that the two tables 12 and 22 always make the same rising and descending run simultaneously.

The transfer of a banderole 2 with the pre-forming and transfer device 1 is diagrammatically illustrated in FIGS. 3 to 5, 12 and 13, bearing in mind that the left and right sides of each one of FIGS. 3 to 5 and 12 and 13 illustrate different positions either of the molding unit 17 or of the shaping member 47.

In FIGS. 3,5 (righthand side) and 12, molding unit 17 is in thermoforming position and applied by means of a holding-down clamp, not shown, against the body 42 of pre-winding unit 21 which rests in supporting table 22. The upper end and the fingers 48 of shaping member 47 are then situated half-way up the forming chamber 18 and the drivers 51 are placed level with the bottom of access slot 30 (left-hand side of FIGS. 3 and 12) so that the introduction of individual band 8 into the pre-winding chamber 23 can already begin during the thermoforming of a container and continues until the end of this thermoforming operation during which the shaping member 47 goes down to the same level as the annular shoulder 27 and its fingers 48 retract inside said body 42 of unit 21 (on the right-hand side of FIGS. 3 and 12).

Thereafter, molding unit 17 and pre-winding unit 21 descend towards the shaping member 47 in the stripping position (on the left-hand side of FIGS. 4 and 13) in which the previously formed container which is still attached to the thermoplastic band 4, can be removed from the vertical path of the molding unit 17 by a one-step horizontal forward movement in the direction of arrow 5. It will be noted that molding unit 17 rises slightly with respect to unit 21 as soon as it is no longer urged downwards by the clamp which are not shown and will stay above the path of the thermoplastic band 4. During the passage from the thermoforming position to the stripping position (left-hand side of FIGS. 4 and 13), the introduction of individual band 8 into chamber 23 can continue. After cutting of said band 8 into banderoles 2, the shaping member resumes its high position in which the driver 51 of transfer member 50 projects slightly from the upper face 42a and from the annular shoulder 27 of pre-winding unit 21 (right-hand side of FIGS. 4 and 13, and FIG. 8) and in which banderole 2 is transferred to forming chamber 18.

During raising up of molding unit 17 and of unit 21 to the thermoforming position, banderole 2 is held by annular shoulder 27 and moves upwardly with respect to shaping member 47 which is then immobilized. During the rising movement of molding unit 17, the pre-winding chamber is not accessible to individual band 8 which is waiting in access slot 30 (left-hand side of FIG. 5) or in another place to be specified hereinafter.

Immediately the molding unit 17 and the pre-winding unit 21 have reached their high thermoforming position (right-hand side of FIG. 5; left-hand side of FIGS. 3 and 12; FIG. 9), the position of shaping member 47 remaining unchanged until the start of the thermoforming operation, a new cycle of introduction of individual band 8 and of its transverse cutting into banderole 2 can start in the pre-winding chamber 23 of unit 21 (left-hand side of FIGS. 3 and 12).

The invention also covers an embodiment of the preforming and transfer device 1 in which the first supporting table 12 of the unit 9 for longitudinally cutting the master-band 7 into individual bands 8 is not movable exclusively in the vertical direction, it also performs a complex movement in order to follow synchronously the rising and descending movements of the second supporting table 22 and of molding unit 17 and also of units 21 and 28 supported by said table 22, so as to keep distance D constant between, on the one hand, a first return roller 3a which follows exactly the vertical movements of table 22 and, on the other hand, the longitudinal cutting unit 9.

In this case, the first supporting table 12 of longitudinal cutting device 9 has, for example, the shape of a fork comprising a transversal branch 12a and two side branches 12b, of which transversal branch 12a extends in parallel to the path (arrow 5) of the band 4, and is pivotally mounted, by its downstream end, opposite or slightly adjacent to one side end of molding unit 17, about a horizontal pin 64 which is also parallel to the path (arrow 5) of said thermoplastic band 4 and which is borne via two bearings 65 by the supporting table 22 of molding unit 17 and of units 21 and 28, said pin 64 being perpendicular to the plane traversing a transversal vertical face of molding unit 17.

The upper face of transversal branch or downstream end 12a of the supporting fork (or table) 12 is provided, for every banderole introduction and transversal cutting unit 28, with a first return roller 3a. As can be seen in FIGS. 10 and 11, all the first return rollers 3a are placed perpendicularly to the upper face of the transversal branch 12a of supporting fork 12, one behind the other, in a row parallel to the pivoting axis 64 and above said pin. Said horizontal articulation 64 of the downstream end or transversal branch 12a is situated at a vertical distance from the supporting table 22 such that the first return rollers 3a are situated in the same zone of level or height as introduction and cutting unit 28. The first return rollers 3a are spaced apart from the front face of the molding unit 17 as well as from one another, thus preventing all contact between two individual bands 8 on their path between the first return rollers 3a and introduction and cutting unit 28. At a distance D from the first return rollers 3a, which distance D is advantageously at least equal to eight times the width of individual bands 8, the side branches 12b of supporting fork 12 presents flanges with bearings 13 receiving the ends of rotation shafts 10a and 11a of blade rollers 10, 11 of the longitudinal cutting device 9 as well as a shaft 67a of a return roller 67.

The free upstream end of supporting table 12, i.e. the side branches 12b of the supporting fork 12 is shaped as a yoke 12c which is open towards the upstream end of fork 12 and which tops a fixed supporting spindle 68 parallel to pivoting pin 64 of the downstream end, i.e. of the transversal branch 12a of the supporting fork (or table) 12 and borne by two fixed bearings 69. Said fixed supporting spindle 68 is very close to the longitudinal cutting device 9 while being at a distance from said pin 64 greater than said distance D, and is provided inside a substantially horizontal plane P also containing said pivoting pin 64 in its median position between its two high and low extreme positions (shown in broken lines in FIG. 11), the spindles of the first return rollers 3a then being situated inside a vertical plane V parallel to the moving direction of the supporting table 22.

It is readily understood that when pivoting pin 64 moves vertically inside plane V with supporting table 22, molding unit 17 and units 21 and 28, the downstream end, namely the transversal branch 12a of the supporting fork follows said movement by pivoting about supporting spindle 68 and by making a small translation in parallel to the longitudinal extension of the supporting fork 12 in order to compensate the small variations of distance between pivoting pin 64 fast with the vertically movable supporting table 22 and fixed supporting spindle 68, which distance variations occur every time table 22 passes from one end position to the other, this corresponding, as indicated hereinabove, to the high thermoforming position and to the low stripping position of the molding unit 17. In both these high and low positions, the axes of the first return rollers 3a are slightly inclined with respect to vertical plane V, but this low inclination is so insignificant that it does not affect the length of the path of each individual band 8 between the longitudinal cutting device 9 and the introduction rollers 32, 33 of the introduction and cutting unit 28.

It is to be noted that during these movements, the distance D between a first return roller 3a and the longitudinal cutting device 9 remains constant and the variations of tension due to the small variations of length of the portion of master-band 7 between the supporting roller 6 and the device 9 which moves in slight translation and pivoting movement about spindle 68 are corrected and compensated by the corresponding pivoting movement of tension roller 15.

FIGS. 12 to 17 illustrate another embodiment of the introduction and cutting unit 28 according to which the support-plate 29 comprises, in front of to every pre-winding chamber 23 of the pre-winding unit 21, a vertical pad 70 housed in an opening 71 of the support-plate 29 and sliding horizontally inside horizontal slide-guides 72 provided in the upper 71a and lower 71b horizontal faces of passage opening 71, the inner vertical face 70a of said pad 70 constituting at the same time part of the side wall 24 of the pre-winding chamber. In said vertical pad 70, is vertically provided the access slot 30 which in one of its outermost positions issues tangentially into pre-winding chamber 23 (FIGS. 14, 15 and 17). The cutter or blade 31 is provided close to the outer face 70a of sliding pad 70, inside opening 71 of support-plate 29, said cutter or blade 31 being horizontally movable and being guided in slide-guides 73 provided in the upper 71a and lower 71b horizontal faces of opening 71, in parallel to sliding pad 70. The cutting edge 31a of cutter 31 is advantageously constituted by one of the outer edges of a passage slot 31b provided in cutter 31 so that said passage slot 31b is in alignment with access slot 30 when cutter 31 and sliding pad 70 are in their outermost starting position (FIGS. 14 and 17).

The outer vertical face of movable cutter 31 is permanently applied against a fixed vertical counter-blade 74 which is also disposed inside passage opening 71 and which is anchored in the upper 71a and lower 71b horizontal faces of said opening 71. Said fixed counter-blade 74 comprises a vertical guiding slot 75 which is aligned with the access slot of the sliding pad 70 and, if it exists, with the passage slot 31b of cutter 31 when the latter and said pad 70 occupy their outermost starting position (FIGS. 14 and 17).

In front of each guiding slot 75 of fixed counter-blade 74 there is provided a pair of introduction rollers 32, 33 between which is pinched an individual band 8, the spindles of said vertical rollers 32, 33 being borne by support arms 34 or any appropriate means, fast with the support-plate 29 which, as in the preceding example, is mounted for pivoting about a horizontal spindle 40 mounted in bearing 41 of body 42 of the pre-winding unit 21.

As in the preceding example, the vertical side face of shaping member 47 defines with the side wall 24, the pre-winding and guiding annular chamber 23 into which the free end of individual band 8 is pushed by introduction rollers 32, 33, when all the slots 30, 31b and 75 respectively of the pad 70, of the cutter 30 and of the fixed counter-blade 74 are aligned (FIG. 17). When the rollers 32, 33 have delivered a length of individual band 8 corresponding to the length of a banderole 2, the introduction into chamber 23 of individual band 8 is interrupted. At that moment, the free end of individual band 8 is situated about halfway of the length or of the width of the pre-winding chamber 23 next to the sliding pad 70 (FIG. 15) and can then be applied against the side wall of the shaping member 47 under the action of a depression created by suction and blowing channels 76 provided in the body of the shaping member 47, at least opposite sliding pad 70.

A banderole 2 is then cut from individual band 8 with the cutter 31 and counter-blade 74, the nex free end of individual band 8 remaining inside the guiding slot 75 of said counter-blade 74 (FIG. 15).

Then, sliding pad 70 moves along the pre-winding chamber 23 until the rear end of banderole 2 is released from access slot 30 and has been introduced into chamber 23 where it is also applied against the side wall of shaping member 47 (FIG. 16). Sliding pad 70 can then return to its outermost starting position where its slot 30 will once again be aligned with the one of cutter 31 which has also resumed its outermost starting position, and with the fixed slot 75 of the counter-blade 74. Another banderole introduction and cutting cycle can then start (FIG. 17). In the meantime, the suction of air through channels 76 has been interrupted and the banderole 2 has been transferred from forming chamber 18 as in the preceding example.

The invention is not in any way limited to the foregoing description, and a number of modifications can be brought thereto without departing from its scope. Also, the examples of members described in the various embodiments of the invention can be interchanged without departing from the spirit of the invention.

What is claimed:

1. In a device for the pre-forming and transfer of a banderole in a container thermoforming installation which comprises a molding unit equipped with a plurality of vertical cylindrical forming chambers, open at their top part and having at their lower part an opening adapted to be closed by a bottom element movable with respect to the molding unit, in such a way as to be capped over by the corresponding molding chamber which is movable with said molding unit between a high position, called thermoforming position and a low position called container stripping position, the improvement comprising:

a master-band supporting roller mounted in fixed bearings, a cutting unit for cutting the master-band longitudinally into individual bands, which unit is mounted on a first supporting table remote laterally from the molding unit, at least one guiding roller of adjustable position for every individual band, a pre-winding unit for pre-winding the banderoles, which unit is placed under the molding unit which rests on it, and is mounted on a second supporting table which is vertically movable between a position corresponding to the thermoforming position and a position corresponding to the stripping position of the molding unit, said pre-winding unit comprising a plurality of vertical cylindrical pre-winding chambers, each one in alignment with one of the forming chambers, so that the vertical wall of the pre-winding chamber defines an outline which is homothetic to that of the forming chamber, yet slightly smaller than the outline of the latter, so as to constitute with its upper edge, an annular holding shoulder member which also defines the bottom opening of the forming chamber, a banderole introduction and cutting unit for every pre-winding chamber, of which part of the vertical side wall is constituted by the inner face of a support-plate of the introduction and cutting unit which further comprises a vertical access slot provided in said support-plate and issuing obliquely into the pre-winding chamber, a cutter adapted to cooperate with a counter-blade for cutting the back end of the banderole introduced at least partly into the pre-winding chamber, and one pair of introduction rollers placed upstream of the cutter and of said slot and adapted to pinch the individual band and to drive same at a pace equal to the length of one banderole, a shaping member comprising a rod which traverses the pre-winding chamber and forms with the vertical wall thereof a narrow annular pre-winding and guiding chamber, and of which the upper part, on the one hand, constitutes at least part of the bottom plate and has a cross-section of similar but smaller shape than that of the vertical wall of the forming chamber, so that the distance between the vertical wall of the forming chamber and the peripheral face of the upper end of the shaping member is at least equal to the thickness of a banderole, and on the other hand, is adapted to penetrate into the forming chamber and to apply said banderole and keep it applied against the vertical side wall of said forming chamber, and transfer means provided in the pre-winding and guiding chamber, and adapted to support said banderole until this has been transferred to the forming chamber by a relative movement between said transfer means and said forming chamber, device wherein:

the shaping member and the transfer member are joined together, and the distance between the upper end of the shaping member and the transfer member is, on the one hand, at least equal to the axial distance between the bottom of the access slot and the central part of the forming chamber and, on the other hand, less than the distance between the upper end of the forming chamber in thermoforming position and the lower end of said forming chamber in stripping position;

the assembly of the elements constituting the banderole introduction and cutting unit is joined to the pre-winding unit by means of the support-plate and is permanently associated with the access slot of the pre-winding chamber;

the first supporting table of the unit for longitudinally cutting the master-band into individual bands is mounted for moving synchronous with the vertical displacements of the second supporting table of the pre-winding unit and the molding unit, and a tension roller is provided on the path of the master-band between its supporting roller and the longitudinal cutting unit, said tension roller being applied against the master-band so as to compensate the length variations of the unrolled portion of the master-band which are due to the displacements of the longitudinal cutting unit during the vertical displacement of the banderole pre-winding unit.

2. Device as claimed in claim 1, wherein the length of the vertical stroke of the first supporting table of the longitudinal cutting unit is identical to that of the second supporting table of the pre-winding unit.

3. Device as claimed in claim 1, wherein the downstream end of the first supportingtable of the longitudinal cutting unit is articulated opposite or slightly aside of a lateral end of the molding unit, on a horizontal axis perpendicular to the plane including a transverse vertical face of the molding unit and borne by the second supporting table of the said molding unit, wherein said downstream end of the first supporting table of the longitudinal cutting unit carries at its upper face, all the first return rollers of the individual bands which are placed in a row parallel to the articulation axis and above same inside the same zone of level or height as the corresponding introduction and cutting units, and whereinthe upstream end of said first supporting table is yoke-shaped, the yoke being open in upstream direction and topping a fixed support spindle, parallel to the pivoting axis of the downstream end of said table and very close to the longitudinal cutting device borne by said first table.

4. Device as claimed in claim 1, wherein the vertical wall of the pre-winding chamber defines an outline which is homothetic to that of the vertical wall of the forming chamber but slightly smaller than the outline thereof so as to constitute, by its upper edge, an annular holding should which, at the same time, defines the bottom opening of said forming chamber.

5. Device as claimed in claim 1, wherein the introduction and cutting unit comprises, on the one hand, a vertical access slot provided in the support-plate and issuing obliquely from the outside into the pre-winding chamber, said access slot being associated with, on the inner face of said support-plate, a cutter adapted to cooperate with one of the inside edges of said access slot in order to cut the rear end of the banderole which has beforehand been entirely introduced in the pre-winding chamber, and, on the other hand, a pair of introduction rollers placed in front of the widening-out entrance to said access slot and of which at least one roller is mounted in bearings fast with said support-plate.

6. Device as claimed in claim 1, wherein the cutter or blade is articulated close to its upper end, on said support-plate by means of a horizontal pivot perpendicular to the blade and to the flat vertical inner face of said support-plate in which is embedded, by three of its faces, a permanent magnet bar which holds the cutter applied against the inner edges of said access slot.

7. Device as claimed in claim 1, wherein the introduction and transversal cutting unit comprises, vertically to each pre-winding chamber, a vertical pad housed in a passage provided in said support-plate, wherein said vertical pad is horizontally slidable and constitutes by its vertical inner face, a part of the side wall of said pre-winding chamber, wherein the access slot is provided in said vertical plate, and wherein the movable cutter is provided in said passage opening next to the outer face of said plate and cooperates with a fixed counter-blade which is also situated inside the passage opening and comprises a guiding slot which is aligned with said access slot when the plate is in its outermost starting position, a pair of introduction rollers being provided in front of said guiding slot and being mounted on said support-plate.

8. Device as claimed in claim 7, wherein the shaping member comprises several suction and blowing channels at least opposite said sliding pad.

9. Device as claimed in claim 1, wherein the pair of introduction rollers comprises a drive roller of large diameter and having a peripheral face with a high friction coefficient as well as a smooth pressing roller of small diameter and having a peripheral face with a low friction coefficient, which latter permanently presses the individual band against the drive roller.

10. Device as claimed in claim 9, wherein the pressing roller is mounted on the support plate via a curved leaf spring which is disposed edgewise so as to partly surround the drive roller and to form with part of the periphery thereof a sort of funnel for guiding the end of the individual band, said funnel narrowing towards its front end (as taken in the moving direction of the individual band) where said curved leaf spring supports the ends of the pressing roller and urges the latter against the drive roller.

11. Device as claimed in claim 10, wherein the front end part of the spring comprises two horizontal support tabs which, by their free end, clamp the lower and upper supporting rings of the pressing roller and, between the two tabs and the pressing roller, a guiding strip of which the free end moves very close to the contact zone between the two introduction rollers.

12. Device as claimed in claim 1, wherein at its lower end situated under the pre-winding chamber, the support-plate is articulated on a horizontal pin mounted in bearings of the body of the pre-winding unit.

13. Device as claimed in claim 1, wherein the shaping member is constituted by a solid or tubular rod carrying at its upper end applicator fingers and mounted for moving vertically inside the forming chamber and the pre-winding chamber, and topping over without any noticeable play the base element.

14. Device as claimed in claim 1, wherein the side face of the shaping member has a shape which is homothetic to that of the vertical wall of the forming chamber and to that of the vertical wall of the pre-winding chamber and defines with said vertical wall of said pre-winding chamber, an annular guiding and pre-winding chamber of which the radial width is between two and five times the thickness of a banderole.

15. Device as claimed in claims 1 or 13, wherein the transfer member comprises a plurality of radial drivers situated in the annular pre-winding chamber, plumb with said applicator fingers and extending radially from the external vertical face of the shaping member with which they are fast, beyond the top of the corresponding applicator fingers, so that their free point is situated outside the periphery defined by the side wall of the forming chamber.

16. Device as claimed in claim 1, wherein the vertical wall of the guiding and pre-winding chamber is provided with vertical grooves of asymmetrical cross-section in each one of which penetrates one driver, and which are open towards said guiding chamber and issue onto the horizontal upper face of the body of the pre-winding unit against which rests the molding unit.

17. Device as claimed in claims 1 or 13, wherein the molding unit is resiliently spaced from the upper face of the body of the pre-winding unit by a distance of about a few millimeters, and the end of rising strokes of the drivers exceeds by a few millimeters the upper face of the pre-winding unit.

18. Device as claimed in claim 1, wherein the simultaneous rising and lowering of the supporting tables used to prevent any lengthening of the path of an individual band between the longitudinal cutting unit and its corresponding pre-winding unit are ensured by a vertical guiding of the two tables and by a plurality of eccentrics of same size and angular position, which actuate rollers provided on the two tables and which are driven synchronously by means of a mechanism with toothed wheels and chains so that the two tables always simultaneously make the same rising or descending run.

19. Device as claimed in claim 1, wherein the translational and pivoting movements of the supporting table of the longitudinal cutting unit are controlled by the vertical movements of the plate supporting table of the molding unit.

20. Device as claimed in claim 15 wherein the vertical wall of the guiding and pre-winding chamber is provided with vertical grooves of asymmetrical cross-section in each one of which penetrates one driver, and which are open towards said guiding chamber and issue onto the horizontal upper face of the body of the pre-winding unit against which rests the molding unit.

21. Device as claimed in claim 15 wherein the molding unit is resiliently spaced from the upper face of the body of the pre-winding unit by a distance of about a few millimeters, and the end of rising strokes of the drivers exceeds by a few millimeters the upper face of the pre-winding unit.

* * * * *